(12) United States Patent
Thomas, III et al.

(10) Patent No.: US 10,353,488 B2
(45) Date of Patent: Jul. 16, 2019

(54) POSITIONAL INPUT ON DISPLAYS

(71) Applicant: Hewlett-Packard Development Company, L.P., Houston, TX (US)

(72) Inventors: Fred Charles Thomas, III, Fort Collins, CO (US); Bruce E. Blaho, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 37 days.

(21) Appl. No.: 15/314,863

(22) PCT Filed: May 30, 2014

(86) PCT No.: PCT/US2014/040154
§ 371 (c)(1),
(2) Date: Nov. 29, 2016

(87) PCT Pub. No.: WO2015/183299
PCT Pub. Date: Dec. 3, 2015

(65) Prior Publication Data
US 2017/0199582 A1 Jul. 13, 2017

(51) Int. Cl.
*G06F 3/033* (2013.01)
*G09G 5/00* (2006.01)
*G09G 5/08* (2006.01)
*G06F 3/03* (2006.01)
*G06F 3/0354* (2013.01)
*G06F 3/042* (2006.01)

(52) U.S. Cl.
CPC ........ *G06F 3/0321* (2013.01); *G06F 3/03545* (2013.01); *G06F 3/0425* (2013.01)

(58) Field of Classification Search
CPC ..... G06F 3/0482; G06F 3/0416; G06F 3/0412
See application file for complete search history.

(56) References Cited

U.S. PATENT DOCUMENTS 6,532,048 B1 * 3/2003 Matsui .............. G02F 1/133536
349/139
7,573,462 B2 8/2009 Ouchi
(Continued)

FOREIGN PATENT DOCUMENTS

CN 101583129 A 10/2010
CN 202738008 U 2/2013
(Continued)

OTHER PUBLICATIONS

Akito Hyakutake et al: "3-D interaction with a large wall display using transparent markers", Proceedings of the International Conference on Advanced Visual Interfaces, AVI '18, 29 Hay 2818 (2818-85-29), p. 97, XP855893861, New.
(Continued)

*Primary Examiner* — Nan-Ying Yang
(74) *Attorney, Agent, or Firm* — Brooks Cameron & Huebsch PLLC (57) ABSTRACT

Positional input systems and methods are provided. Using a handheld device comprising a detector, to which display of a plurality of displays a detector is proximate may be determined. Using the detector, at least a part of an optical pattern disposed on the display to which the detector is proximate may be detected. The part of the optical pattern may correspond to a location on the display.

14 Claims, 5 Drawing Sheets

(56) References Cited

U.S. PATENT DOCUMENTS

| | | | |
|---|---|---|---|
| 8,359,551 | B2 | 1/2013 | Fabrick, II |
| 2005/0125407 | A1* | 6/2005 | Kraus .................. G06F 21/575 |
| 2006/0244719 | A1 | 11/2006 | Brigham, II et al. |
| 2007/0132553 | A1* | 6/2007 | Nakashima ............. B60R 25/24 340/5.72 |
| 2008/0219522 | A1 | 9/2008 | Hook |
| 2008/0252064 | A1* | 10/2008 | Sekine .................. B42D 15/00 283/91 |
| 2009/0195402 | A1 | 8/2009 | Izadi et al. |
| 2010/0001963 | A1 | 1/2010 | Doray et al. |
| 2011/0121950 | A1 | 5/2011 | Izadi et al. |
| 2012/0242603 | A1* | 9/2012 | Engelhardt ......... G06F 3/03545 345/173 |
| 2013/0135254 | A1 | 5/2013 | Lee et al. |
| 2013/0187893 | A1 | 7/2013 | Campbell |
| 2014/0125580 | A1* | 5/2014 | Eun ..................... G06F 3/017 345/156 |
| 2015/0102104 | A1* | 4/2015 | Milsted .................... G09C 5/00 235/440 |

FOREIGN PATENT DOCUMENTS

| | | |
|---|---|---|
| CN | 103024176 A | 4/2013 |
| EP | 2320192 A1 | 5/2011 |
| EP | 2667286 | 11/2013 |
| JP | 2013037535 | 2/2013 |
| TW | 200939667 A | 9/2009 |
| WO | WO-2013039514 A1 | 3/2013 |

OTHER PUBLICATIONS

Bi, X. et al., uPen: Laser-based, Personalized, Multi-User Interaction on Large Displays [online], Nov. 6-11, 2005, Retrieved from the Internet <http://citeseerx.ist.psu.edu/viewdoc/download?doi=10.1.1.215.8004&rep=rep1&type=pdf [retrieved on Feb. 18, 2014].

English translation (machine-generated) of Abstract from Chinese Patent Publication No. 10153129A [retrieved on Feb. 18, 2014], Retrieved from the Internet: <http://worldwide.espacenet.com/publicationDetails/biblio?DB=worldwide.espacenet.com&ll=0&ND=3&adjacent=true&locale=en_EP&FT=D&date=20101006&CC=CN&NR=101853129A&KC=A>.

English translation (machine-generated) of Abstract from Chinese Patent Publication No. CN103024176A [retrieved on Dec. 11, 2013], Retrieved from the Internet: <http://worldwide.espacenet.com/publicationDetails/biblio?DB=worldwide.espacenet.com&ll=0&ND=3&adjacent=true&locale=en_EP&FT=D&date=20130403&CC=CN&NR=103024176A&KC=A>.

English translation (machine-generated) of Abstract from Chinese Patent Publication No. CN202738008U [retrieved on Dec. 11, 2013], Retrieved from the Internet:<http://worldwide.espacenet.com/publicationDetails/biblio?DB=worldwide.espacenet.com&ll=0&ND=3&adjacent=true&locale=en_EP&FT=D&date=20130403&CC=CN&NR=103024176A&KC=A>.

Leitner, J. el al., FLUX A Tilting Multi-touch and Pen Based Surface [online], Apr. 23, 2009, Retrieved from the Internet <http://mi-lab.org/files/2009/04/leitner2009_chi2009_flux.pdf> [retrieved on Feb. 18, 2014].

Swindells, C. et al., That One There! Pointing to Establish Device Identity, Aug. 13, 2002, [Downloaded on Dec. 11, 2013] < http://cuip.uchicago.edu/~joi/thesis/that-one-there-pointing.pdf >.

Viewsonic Corporation, Large-format Display with Multi-touch Interactivity to Encourage Collaboration [online], Sep. 27, 2013, Retrieved from the Internet <http://www.viewsoniceurope.com/uk/products/swb8451.htm> [retrieved on Feb. 18, 2014].

Weibel, N. et al., Exploring Pen and Paper Interaction with High-resolution Wall Displays, Oct. 3-6, 2010, pp. 455-456, UIST 2010, ACM 978-1-4503-0271-5/10/10, New York, New York US.

* cited by examiner

POSITIONAL INPUT ON DISPLAYS

CROSS-REFERENCE TO RELATED APPLICATION

This application is a U.S. National Stage Application of and claims priority to International Patent Application No. PCT/US2014/040154, filed on May 30, 2014, and entitled "POSITIONAL INPUT ON DISPLAYS," which is hereby incorporated by reference in its entirety.

BACKGROUND

Devices such as touch screens provide an elegant, simple, and industrially "clean" design for providing capabilities of both input, e.g. touch, and output, e.g. display. A touchscreen can be formed by placing a transparent overlay proximate the display surface. Such overlays typically detect the presence and location of input, e.g. a touch, based upon a change in electrical properties of the overlay.

BRIEF DESCRIPTION OF THE DRAWINGS

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

A detector, which may be part of a handheld device such as a digital stylus or digital pen, may be provided. A predetermined series of positionally-encoded elements usually in the form of dots, squares, or similar marks may be provided on a display device. One such series of elements is the unique, predetermined positionally-encoded pattern provided by Anoto Group AB (Lund, Sweden). Using the predetermined pattern, a detector can determine its location with respect to the pattern when placed proximate the pattern. The location resolution capability of the detector may, for example, be increased (1) by increasing the positional accuracy of the elements relative to each other, and/or (2) by increasing the number of dots used simultaneously to ascertain a location address, such that error is decreased in locating the dots. The detector may be a two-dimensional array detector such as a CMOS or charge-coupled device (CCD) imager. The detector may be suitably designed to be capable of high-resolution detection, such that it supports the location resolution capability of the pattern, as described above. A visibly transparent, predetermined, element pattern may be disposed in, on, or about a visibly transparent carrier. In one example, a source may generate polarized light. The source may be internal to a computing device housing the display or may be external to the computing device, for example part of the handheld device. The polarized light generated may be passed through a predetermined pattern of visibly transparent polarizing state altering elements disposed on the surface of a display device, and a change in the polarization state of the polarized light between the positionally-encoded elements and the display background may be detected by a detector. The change may correspond to a location of the detector on the display device. In some examples, the location may be determined with high resolution and accuracy. The handheld device may include a transmitter to transmit data representing the location of the detector to a computing device. In response, the computing device may cause the display device to modify its output.

Although the optical pattern is described above as comprised of polarizing elements, other types of optical patterns may also be used. For example, rather than polarizing elements, the pattern may be a pattern of near-infrared (near-IR) absorbing ink printed elements, such as dots or any other shape. In this example, the source, which is external or internal to the computing device, may generate near-IR light that is absorbed by the absorbing elements. The near-IR light need not be polarized. The near-IR light may be passed through the pattern of absorbing elements and reflected or passed to the detector. The detector may detect the pattern based on a detected contrast between regions in which absorbing elements absorbed the near-IR light, and regions in which there were no absorbing elements and therefore the near-IR light was not absorbed.

In other examples, any other optical pattern may be provided that enables detection using optical methods, using any suitable type of elements that make up the optical pattern, with or without a light source.

The above system may provide high resolution and high accuracy of touch-based input on displays, and visually transparent input systems. However, in some examples, there may be multiple displays and/or multiple handheld devices present in the vicinity of the handheld device.

Accordingly, the present disclosure provides systems and methods to provide, in a multi-display system, the capability of identifying to which display a handheld device used for display interaction is proximate. The present disclosure may also provide, in a multi-handheld device system, the capability of managing inputs from the various handheld devices.

As used herein, the term "light" refers to electromagnetic radiation falling within the visible spectrum, which extends from 400 nanometers (violet) to 700 nanometers (red). The term "light" may also include electromagnetic radiation falling within the near-infrared spectrum, extending from 700 nanometers to 3000 nanometers.

Figure 1:
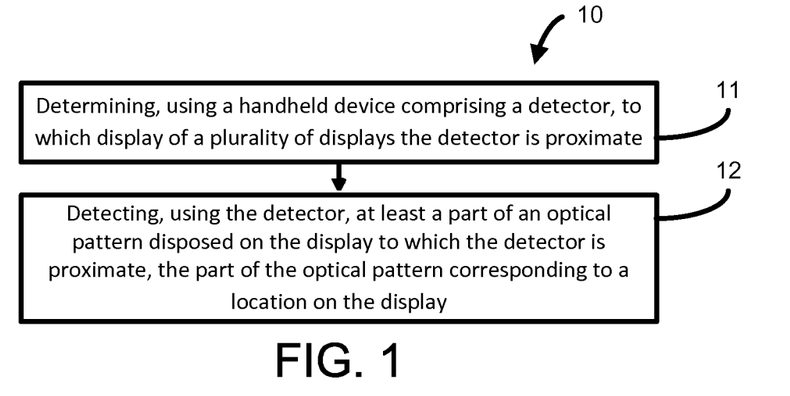
FIGS. 1, 3, and 5-9 are flow diagrams illustrating positional input methods according to some examples.

FIG. 1 is a flow diagram illustrating a positional input method 10 according to some examples. At 11, to which display of a plurality of displays a detector is proximate may be determined. At 12, using the detector, at least a part of an optical pattern disposed on the display to which the detector is proximate may be detected. The part of the optical pattern may correspond to a location on the display.

Figure 2:
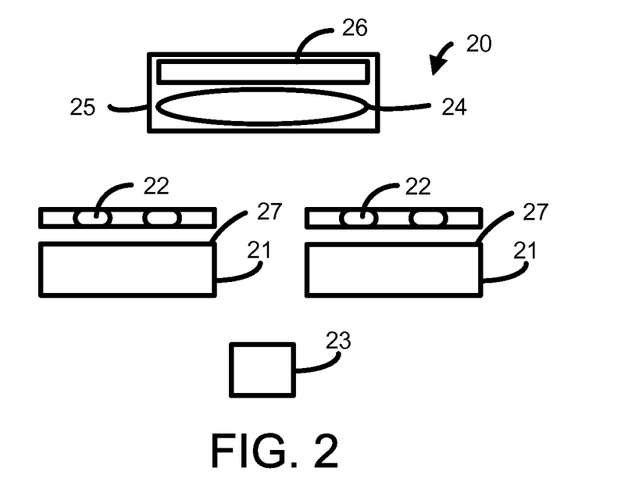
FIGS. 2 and 4 are block diagrams illustrating positional input systems according to some examples.

FIG. 2 is a block diagram illustrating a positional input system 20 according to some examples. The system 20 may include a plurality of displays 21. Each of the displays 21 may have disposed thereon a respective predetermined optical pattern 22. The system 20 may include a processor 23 to determine to which a display of a plurality of displays 21 a detector 24 is proximate. Although the processor 23 is shown external to other elements in the system 20, the processor 23 may be located in any of the devices in the system 200. The system 20 may include a handheld device 25 having the detector 24 and a transmitter 26. The detector 24 may be to detect a part of the predetermined pattern disposed on the display 21 to which the detector 24 is proximate. The part of the predetermined pattern may correspond to a location on a surface 27 of the display 21. The transmitter 26 may be to transmit data representing the location of the handheld device to a computing device communicatively coupled to the handheld device 25.

Figure 3:
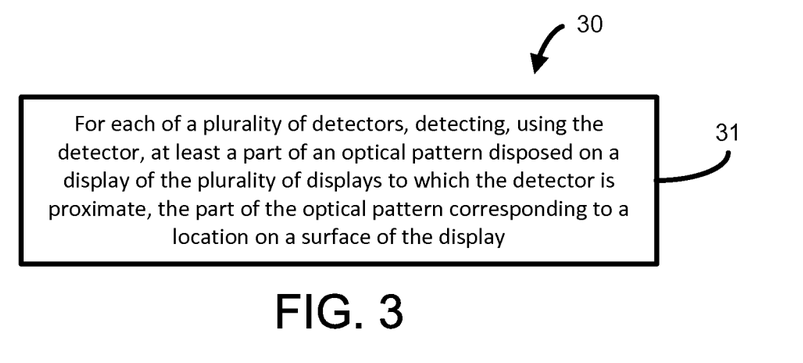

FIG. 3 is a flow diagram illustrating a positional input method 30 according to some examples. The method may be performed in a system comprising a plurality of displays each having disposed thereon a respective optical pattern. At 31, for each of a plurality of detectors, at least a part of an optical pattern disposed on a display of the plurality of displays to which the detector is proximate may be detected using the detector. The part of the optical pattern may correspond to a location on a surface of the display.

Figure 4:
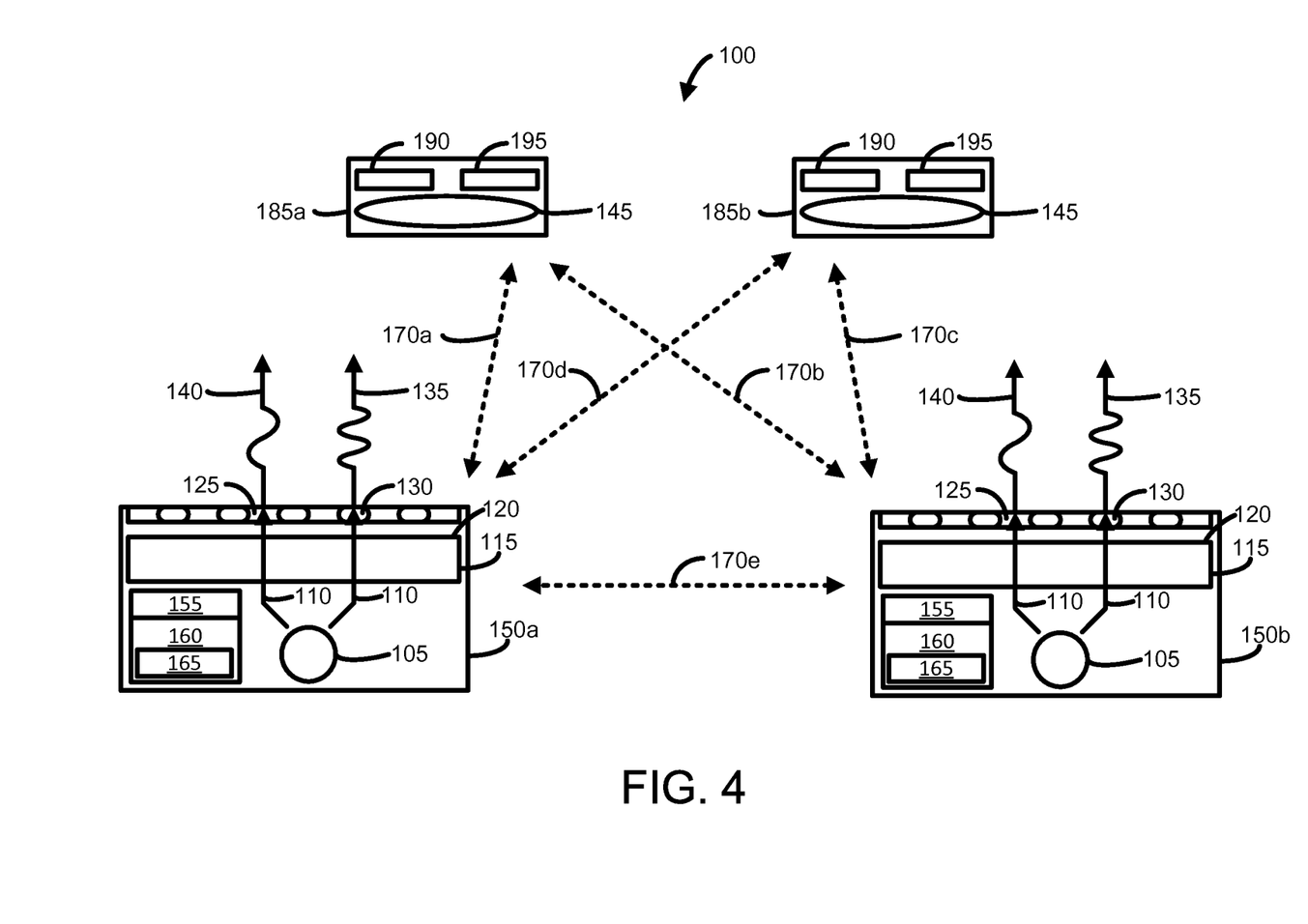

FIG. 4 is a block diagram illustrating a positional input system 100 according to some examples. The system 100 may include a computing devices 150a-b and handheld devices 185a-b. Each of the handheld devices 185a-b has a detector 145 and a controller 190. Each handheld device 185a-b may be a stylus, cell phone, smartphone, remote controller, pen, or any other suitable handheld device. The handheld devices 185a-b may be different types of the devices relative to one another. Although the following description will specifically describe operation of the computing device 150a and handheld device 185a, the computing device 150b is similar to the computing device 150a, and the handheld device 185b is similar to the handheld device 185a.

The computing device 150a may be a tablet, laptop, smartphone, desktop, television, or any other type of computing device. The computing device 150a may include a processor 155 for executing instructions such as those described in the methods herein. The processor 155 may, for example, be a microprocessor, a microcontroller, a programmable gate array, an application specific integrated circuit (ASIC), a computer processor, or the like. The processor 155 may, for example, include multiple cores on a chip, multiple cores across multiple chips, multiple cores across multiple devices, or combinations thereof. In some examples, the processor 155 may include at least one integrated circuit (IC), other control logic, other electronic circuits, or combinations thereof.

The processor 155 may be in communication with a computer-readable storage medium 160 via a communication bus. The computer-readable storage medium 160 may include a single medium or multiple media. For example, the computer readable storage medium 160 may include one or both of a memory of the ASIC, and a separate memory in the computing device 150a. The computer readable storage medium 160 may be any electronic, magnetic, optical, or other physical storage device. For example, the computer-readable storage medium 160 may be, for example, random access memory (RAM), static memory, read only memory, an electrically erasable programmable read-only memory (EEPROM), a hard drive, an optical drive, a storage drive, a CD, a DVD, and the like. The computer-readable storage medium 160 may be non-transitory. The computer-readable storage medium 160 may store, encode, or carry computer executable instructions 165 that, when executed by the processor 155, may cause the processor 155 to perform steps of any of the methods or operations disclosed herein according to various examples.

The computing device 150a may include a display device including a display 115 which may have a surface 120. The display 115 may be communicatively coupled to the processor 155 and computer-readable medium 160 via the communication bus.

The controller 190 may include a processor and computer-readable medium similar to processor 155 and computer-readable medium 160 so as to perform certain steps of the methods disclosed herein.

The computing device 155 may include a polarized light source 105 providing light having a polarization state 110. The polarized light source 105 may be within or proximate to the display 115. A carrier 125 having a predetermined pattern, e.g. an optical pattern, of visibly transparent polarization altering elements 130 may be disposed proximate the surface 120 to change or otherwise alter the polarization state 110 of at least a portion of the incident light produced by the polarized light source 105 to provide light having a changed polarization state 135. The polarization state of light passing through the carrier 125 but NOT passing through a polarizing element 130 may be changed to a polarization state 140 that differs in one or more characteristics from (1) light having polarization state 110 that is from the source 105, and (2) light having changed polarization state 135 that is exiting from one of the polarizing elements 125.

The differing changed polarization states 135 and 140 of the light exiting the display 115 may enable the "reading" of the pattern of polarizing elements 130 using a detector 145 that may be capable of distinguishing the changed polarization states 135 and 140. Reading the pattern of polarizing elements may be possible based upon the ability of the detector 145 to discern the changed polarization state 135 of light exiting the polarizing elements 130 from the background changed polarization state 140 of light exiting the carrier 125.

Based upon the unique encoded absolute positional information between the visibly transparent polarizing elements 130, the detector 145 may determine its location on the surface 120 of the display 115. The pattern and relative accuracy of the visibly transparent polarizing elements 130 may contribute to the accuracy of the detector 145 in determining its location with respect to the display 115. A higher accuracy and/or higher density pattern of visibly transparent polarizing elements 130 disposed across the surface 120 of the display 115 may generally improve the accuracy of the location determination by the detector 145. Based upon the unique encoded absolute positional information between the visibly transparent polarizing elements 130, an extremely precise determination of detector 145 location with respect to the pattern of polarizing elements 130 may be possible.

The polarization state 110 may include a plurality of polarization states. However, in some examples, the light may be provided using a polarized light source 105 generating light having ONLY the polarization state 110, e.g. a linear polarized light source producing only one of a vertically polarized light or a horizontally polarized light. In yet other examples, the light may be provided using a non-specific polarized light source 105 generating light having a plurality of polarization states, e.g. a polarized light source 105 producing at least two of vertically, horizontally, or circularly polarized light. The light produced using a non-specific polarized light source 105 may be filtered or similarly adjusted to provide light having only the polarization state 110. The polarized light source 105 can include any number of individual polarized light sources.

The display 115 may have a surface 120 from which light having the polarization state 110 exits or is otherwise emitted. The display 115 may incorporate any technology, for example liquid crystal display (LCD) technology; light emitting diode (LED); organic LED (OLED); active matrix OLED (AMOLED); or any other display technology. Although not depicted as such in FIG. 4, the polarized light source 105 may be incorporated into the display 115, for example the independent LEDs forming an LED display 115 may each be considered a polarized light source 105. Alternately, LCD displays emit linear polarized light via their inherent design.

A carrier 125 having predetermined pattern of visibly transparent polarizing elements 130 disposed therein may be disposed proximate, e.g. applied to, the surface 120 to change or otherwise alter the polarization state 110 to provide (1) light passing through the polarizing element 130 and having a changed polarization state 135, and (2) light passing through the carrier 125 and having changed polarization state 140. The carrier 125 may be any substrate made of a material that does not affect the polarization state of light transiting the carrier. The carrier 126 may be applied to the surface 120 of the display 115 via a bonding agent. The carrier 125 may, for example, be a sticker, panel, glass substrate, or any suitable carrier. However, in other examples, the predetermined pattern of visibly transparent polarizing elements 130 may be applied directly to the surface 120 of the display 115, for example such that the elements 130 are integral on the surface 120. Thus, it is understood herein that when it is stated that the elements 125 are "disposed on" the display 120, this encompasses both (1) examples in which a carrier 125 is used, and (2) examples in which the elements 130 are applied directly on the display. Additionally, to the extent any of the examples are described herein relative to using a carrier 125, it is understood that such examples can also be implemented by directly applying the elements 130. In some examples, an additional carrier, such as a sticker or other carrier, may be applied on area "proximate to the display", that is, to an area of the computing device 150a other than the display 115. For example, the carrier 125 may be applied adjacent to the display 115 and/or around the periphery of the display area on the same side of the computing device 150a on which the display 115 is disposed. The additional carrier may be used for determining to which display a detector is proximate, as will be described relative to FIG. 6.

The polarization state of light passing through each the transparent polarizing elements 130 disposed on the surface 120 of the display 115 may be altered or otherwise changed based upon physical characteristics, composition, or a combination thereof, of the polarizing element 130. Each of the transparent polarizing elements 130 can be composed of a material, for example a polymeric material, capable of transforming or otherwise altering the polarization state of light passing through the polarizing element. For example, linear vertically polarized light generated by a source and passing through a polarizing element 130 may be phase retarded ¼ wave in one direction, for example left or right, while the linear polarized light passing through only the carrier 125 may be phase retarded ¼ wave in the opposite direction. Other changes in polarization state of the light passing through the carrier 125, the polarizing elements 130, or both may be used. Similarly, any polarized light source 105 may be used such that the changed polarization state 135 of the light passing only through the polarizing elements 130 is distinguishable from the changed polarization state 140 of the light passing only through the carrier 125.

An example polymeric material capable of providing the transparent polarizing elements 130 can include, but is not limited to, a photo-aligned, anisotropic optical thin film such as that produced by Rolic® Research Ltd., although other materials and other manufacturers capable of providing similar polarization based filtering capabilities may be substituted. Rolic® provides a curable, liquid, light controlled molecular orientation ("LCMO") polymeric material suitable for photo lithographically producing the polarizing elements 130 within the carrier 125. Through the use of LCMO materials it is possible to create structured optical elements on a microscopic or macroscopic scale using light-induced spatial alignment of molecules within the LCMO material. LCMO aligns molecules, for example the molecules forming the polarizing elements 130, in a predefined way in photo alignment layers by irradiating them with ultra-violet polarized light. Based upon the choice of materials and the direction of incidence and polarization of the light used to form the polarizing elements 130, it is possible for the molecules forming the polarizing elements 130 to be aligned in any direction of the three-dimensional space. An index of refraction birefringence maybe introduced in the material hence producing these polarization altering phase retarding elements.

When disposed upon or formed within a suitable carrier 125, the visibly transparent polarizing elements 130 are not visible to the naked eye when back-illuminated (for example, when back illuminated by the polarized light source 105). The visibly transparent polarizing elements 125 can be deposited on or otherwise formed within the substrate using any method or system, including but not limited to, photolithography and conventional printing technologies.

The polarizing elements 130 can be disposed within the carrier 130 in a unique, specific, spatial or positional pattern. The use of such a pattern creates a geometric relationship between the polarizing elements 130 and their location on the display 115. The geometric relationship between the polarizing elements 130 and the display 115 permit the ability to determine the location of the detector 145 sensitive to the changed polarization state 130 of the light emitted by the polarizing elements 130 when the detector 145 is disposed proximate the display 115.

The pattern of light having the changed polarization state 130 sensed by the detector 145 permits the precise determination of the physical location of the detector 145 on the display 115. Increasing the location accuracy or density of the polarizing elements 130 (for example by forming greater numbers of physically smaller, closer grouped polarizing elements 130) enhances the location detection capability of the detector 145. The size of each of the polarizing elements can vary based on factors such as desired resolution, mastering technique, and the overall size of the display 115 however in general the size of the polarizing elements 130 is on the order of 100 microns and can be as small 15 to 25 microns diameter.

An example pattern capable of providing unique encoded absolute positional information between the visibly transparent polarizing elements 130 is the Anoto dot pattern described above. Disposing the polarizing elements 130 in an Anoto compliant pattern provides a unique location identification system using the detector 145 capable of detecting the changed polarization state 135 of the light passing through the polarizing elements 130. Although the Anoto dot pattern is used as an illustrative example, any comparable predetermined pattern capable of providing unique encoded absolute positional information between the visibly transparent elements 130 may be similarly employed to dispose or locate the elements 130 in, on, or about the carrier 125.

Since changes in the polarization state of light are imperceptible to the human eye, the light emitted by the display 115 may appear uniform across the display regardless of the changed polarization states 135 and 140 of the light. The ability to provide a visually transparent carrier 125 containing visually transparent polarizing elements 130 may enable the use of a detector 145 sensitive to the changed polarization state 135 of the light passing through the polarizing elements 130 to determine the physical location or position of the detector 145 on the display 115 while at the same time providing minimal impairment of the user's view of the display 115. The ability to provide location based data to the detector 145 while simultaneously providing a minimally impaired view of the display 115 to the user provides the display with the ability to contemporaneously function as both an input device, e.g. a device capable of detecting location based input via the detector 145, and an output device, e.g. a display capable of displaying data. An example of the utility of such a device can be found in a display based input tablet. Such a tablet may enable easy, customizable, user configuration of various tiles and input designators on the tablet surface.

The detector 145 may include any device, system, or combination of systems and devices suitable for detecting the changed polarization 135 of the light exiting the polarizing element 130. For example, a detector 145 sensitive to the changed polarization state 135 of the light exiting the polarizing elements 130 may incorporate a circular polarizer analyzer of appropriate handedness and a linear polarizer alignment to discriminate patterns that use ¼ wave polarizing elements 130 of opposite rotational handiness. Other polarization sensitive technologies with similar performance can be used as the basis for the detector 145.

Where the detector 145 is used as an input device to a tablet or where the detector 145 is used similar to a drafting pen, physical displacement of the detector 145 across the surface 120 of the display 115 may affect the scan rate, exposure, and blur reduction capabilities of the detector 145 to properly discern the pattern of polarizing dots 135. A strobed and short duration LED near-IR illuminator in the handheld device 185a may be used to freeze motion and compensate for these motion effects and allow for high rate translation motion of the handheld device 185a. Additional logic may therefore be incorporated into the detector 145 to increase or decrease the detector scan rate based at least in part upon the velocity with which the detector 145 is moved across the surface 120 of the display 115. Similarly, the logic providing for exposure compensation and blur reduction can also be incorporated into the detector 145 based at least in part upon the velocity with which the detector is moved across the surface 120 of the display 115.

The handheld device 185a may include a transmitter 195 to transmit data representing the location of the detector to a computing device. The data representing the location may be the detected pattern.

In some examples, in addition to or as an alternative to the light source 105 inside the computing device 150a and behind the display 115, a light source, such as an IR source, may be provided external to the computing device 150a. The IR source may be provided as part of the handheld device 185a and/or may be attached to the detector 145. This light source may then also be used during detection, as described in U.S. Application No. PCT/US2011/051968 filed on Sep. 16, 2011, entitled "Positional Input Systems and Methods", the entire contents of which are hereby incorporated herein by reference.

As shown, the handheld device 185a may be communicatively coupled with computing device 150a over connection 170a, and with computing device 150b over connection 170b. The handheld device 185b is communicatively coupled with computing device 150a over connection 170c, and with computing device 150b over connection 170d.

Additionally, the computing devices 150a and 150b may be communicatively coupled to each other over connection 170e. The connections 170a-e may be wired or wireless. Wireless communication may be performed by a Bluetooth connection and/or any other radio frequency (RF) transmission, for example.

In some examples, the system 100 may allow various methods to be described herein to be performed with one of the handheld devices 185a-b serving as a host device in communication with the computing devices 150a-b, such that the computing devices 150a-b need not be in communication with each other. In other examples, one of the computing devices 150a-b, or another computing device separate from the computing devices 150a-b having displays 115, may serve as a host device in communication with the other computing device and in communication with the handheld devices 185a-b.

In some examples, rather than two computing devices 150a-b, there may be three, four, or any greater number of computing devices. Additionally, rather than two handheld devices 185a-b, there may be three, four, or any greater number of handheld devices.

FIGS. 5-8 are flow diagrams illustrating positional input methods 300, 400, 500, and 600 according to some examples. In some examples, these methods may be varied, such that some steps may be added, and some steps may be omitted. In describing FIG. 5-8, reference will be made to FIG. 4. Each of these methods relate to determining to which display 115 a detector 145 is proximate, when multiple displays 115 are present in the area. Although these methods describe operation relative to handheld device 185a, it is understood that handheld device 185b may be operated with the computing devices 150a-b as well. Simultaneous use of multiple handheld devices 185a-b will be described relative to method 700 of FIG. 9.

Figure 5:
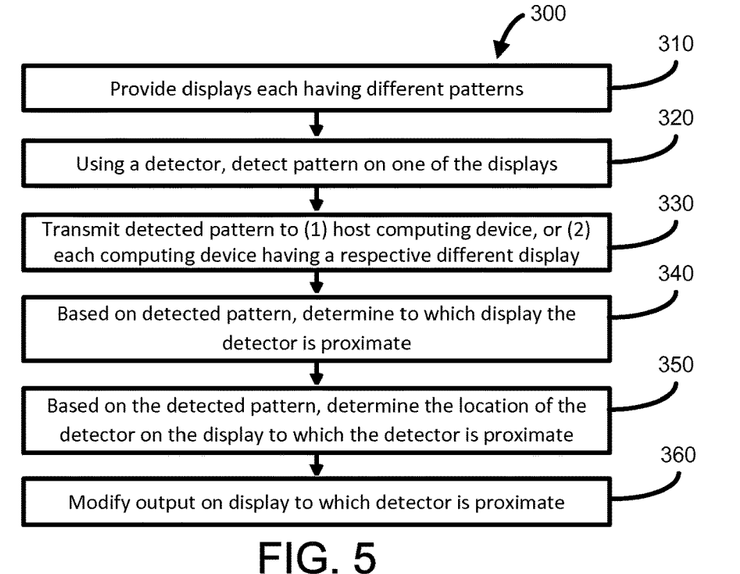

Turning to FIG. 5, at 310, multiple computing devices 150a-b having displays 115 may be provided. Each of the displays 115 may have different patterns disposed on or proximate to the displays 115 relative to each other.

In some examples, if carriers 125 are provided on or proximate to each of the displays 115 of the computing devices 150a-b, then each of the carriers 125 may have different patterns relative to one another. For example, each pattern may be a different optical pattern of visibly transparent polarization altering elements 130, for example different Anoto dot patterns.

In some examples, the patterns on the carriers 125 may be different from one another across the entire area spanned by the carriers 125 on the displays 115. In other examples, the patterns on different carriers 125 may be different from one another only across part of their respective areas. For example, one of the corners of each carrier 125, such as the top-right corner of each carrier 125, may have a unique pattern, whereas the remainder of each carrier 125 may have an identical pattern compared to the other carriers 125.

In yet other examples, each display 115 may be provided with two carriers 125, wherein the first carrier 125 has a pattern that is identical to first carriers 125 on the other displays, and the second carrier 125 has a unique pattern. In these examples, each of the first carriers may be identical L-shaped carriers, for example, with the second carriers 125 each disposed in the region of the display 115 not covered the first L-shaped carriers 115. In other examples, the first carriers 125 may cover each of their entire respective displays 115, and each of the second carriers 125 may be disposed on top of subsets of the first carriers 125, or the second carriers 125 may be disposed proximate to their respective displays 125 on an area of the computing device other than the display 115. For example, each of the second carriers 125 may be applied adjacent to the display 115 and/or around the periphery of the display area on the same side of the computing device 150a on which the display 115 is disposed.

In other examples, if the patterns of polarizing elements 125 are applied directly to the displays 115, then similarly as above, each of the displays 115 may have different patterns relative to one another. In some examples, the patterns on the displays 115 may be different from one another across the entire area spanned by the displays 115. In other examples, the patterns on different displays 115 may be different from one another only across part of their respective areas. For example, one of the corners of each display 115, such as the top-right corner of each display 115, may have a unique pattern, whereas the remainder of each displays 115 may have an identical pattern compared to the other displays 115.

In yet other examples, if the patterns of polarizing elements 125 are applied directly to the displays 115, then each of the displays 115 may have the same patterns relative to one another. However, each display 115 may additionally have a carrier 125 disposed thereon or proximate thereto which may cover part of its respective display 115 or may be on an adjacent part of the computing device 115, wherein each carrier 125 has a different pattern relative to the others.

At 320, the handheld device 185a may be placed proximate to one of the displays 115 of computing devices 150a-b, such as of computing device 150a. The handheld device 185a may be placed proximate to a part of the display 115 on which a unique pattern is disposed, according to any of the examples discussed at 310.

In some examples, the handheld device 185a may be placed proximate to a pattern that is disposed on the display 115, such that detection of part of the pattern disposed on the display may serve the dual purpose of (1) determining to which display 115 the handheld device 185a is proximate, and (2) determining the physical location of the handheld device 185a on the display 115 to which the handheld device 185 is proximate.

In other examples, the handheld device 185 may first be placed proximate specifically to a unique first pattern that identifies the display 115 for determining to which display 115 the handheld device is proximate. For example, the unique pattern may be disposed on or proximate to the display 115 according to any of the examples discussed at 310. Thereafter, the handheld device 185a may be placed proximate to a part of the display 115, such that detection of part of a second pattern disposed on the display 115 may be used for determining the physical location of the handheld device 185a on the display 115.

Any of the foregoing pattern detections may be performed as follows.

Light having the polarization state 110 may be generated using the polarized light source 105 of computing device 150a that may be located on the non-viewable, or reverse, side of the display 115. In some examples, the light may be generated having the polarization state 110. In other examples, if the light is generated having multiple polarization states or no polarization state, then the polarization state 110 may be a single polarization state provided using a filter disposed between the source 105 and the display 115. In any of the above examples, the polarization state 110 may be a linear polarization state, or another type of polarization state. The polarized light 110 may pass through the display 115, exiting the surface 120 of the display 115 of computing device 150a.

A portion of the polarized light 110 may pass through the carrier 125 of computing device 150a, while the remaining portion of polarized light 110 may pass through the polarizing elements 130. The polarization state of the polarized light 110 passing through the polarizing elements 130 may attain a changed polarization state 135, while the polarization state of the linear polarized light 110 passing through the carrier 125 may attain a changed polarization state 140.

The pattern of changed polarization states 135 of the light exiting the polarizing elements 130 is detected using the detector 145 of handheld device 185a. The pattern may represent unique encoded absolute positional information between the visibly transparent polarizing elements 130 corresponding to a unique physical location of the detector 145 on the surface 120 of the display 115.

Although detection above is described using the example of FIG. 4, any optical pattern based method of detection may be used. For example, detection may be performed using an external light source instead of a light source internal to the computing device 150a, as discussed earlier and as is described in U.S. Application No. PCT/US2011/051968 filed on Sep. 16, 2011, entitled "Positional Input Systems and Methods". In examples in which a pattern is not disposed on the display and instead is disposed on another part of the computing device 150a, detection using the external light source may be suitable because an internal light source may not be able to pass light through the pattern.

In another example, detection may be performed using near-infrared (near-IR) absorbing ink printed elements instead of polarizing elements, as discussed earlier. Any other suitable optical detection methods may also be used, as discussed earlier.

At 330, data representing the detected pattern may be transmitted to one or more computing devices 150a-b. In some examples, such as if the handheld device 185 is the host device, the handheld device 185a may communicate, e.g. transmit or send, the data representing the detected pattern to each of the computing devices 150a-b. In other examples, such as if the computing device 150b is the host device, the handheld device 185a may communicate, e.g. transmit or send, the data representing the detected pattern to the host computing device 150b.

At 340, based on the detected pattern, which may be unique to a particular display 115, it may be determined to which display the detector 145 is proximate. In some examples, such as if the handheld device 185a is a host device, each computing device 150a-b may have pattern data stored in its computer-readable medium 160 representing which pattern is on its carrier 125. Each respective computing device 150a-b may compare the pattern in its stored pattern data with the detected pattern data representing part of the pattern detected by the handheld device 185a. If the detected part of the pattern matches a part of the stored pattern data of one of the computing devices 150a-b, this indicates that the handheld device 185a is proximate to the display of that respective computing device 150a-b and is not proximate to the others.

In other examples, such as if the computing device 150b is a host device, the computing device 150b may have pattern data stored in its computer-readable medium 160 representing patterns on the carriers of each of the computing devices 150a-b. Thus, the host computing device 150b may compare the patterns in its pattern data with the pattern data representing part of the pattern detected by the handheld device 185a to determine which computing device's pattern matches the detected part of the pattern. This may indicate to which computing device 150a, 150b, or 150c the handheld device 185a is proximate.

In yet other examples in which the computing device 150b is a host device, the computing device 150b may communicate the detected pattern data to each of the other computing devices, such as computing device 150a. In these examples, each computing device 150a-b may have pattern data stored in its computer-readable medium 160 representing which pattern is on its carrier 125. Each computing device 150a-b may compare the pattern in its stored pattern data with the detected pattern data representing part of the pattern detected by the handheld device 185a. Thus, the comparison and determination of to which computing device 150a-b the handheld device 185a is proximate may be made.

At 350, based on the detected pattern, a computing device may determine the physical location of the handheld device 185a and detector 145 on the display 115 to which the detector was determined to be proximate at 340. This determination may be made by the computing device 150 or 150b housing the display 115 to which the detector 145 and handheld device 185a is proximate, by the controller 190 in the detector, or by one of the other computing devices in the system 100.

The detected pattern may represent unique encoded absolute positional information between the visibly transparent polarizing elements 130 corresponding to a unique physical location of the detector 145 and handheld device 185a on the surface 120 of the display 115. Thus, the physical location of the detector 145 may be determined by comparing the detected pattern to the stored known patterns of the carrier 125 of the display 115 to which the detector 145 is proximate.

At 360, the computing device 150a-b to which the detector 145 is proximate may, after determining and/or receiving the physical location data, communicate to its display 115 to modify its output, e.g. to modify the color of pixels being displayed at the physical location. For example, if a user is using the handheld device 185a to draw on the display 115, the determined physical location of the display 115 may display colored lines to represent the drawing in response to the handheld device 185a being proximate to that physical location.

Figure 6:
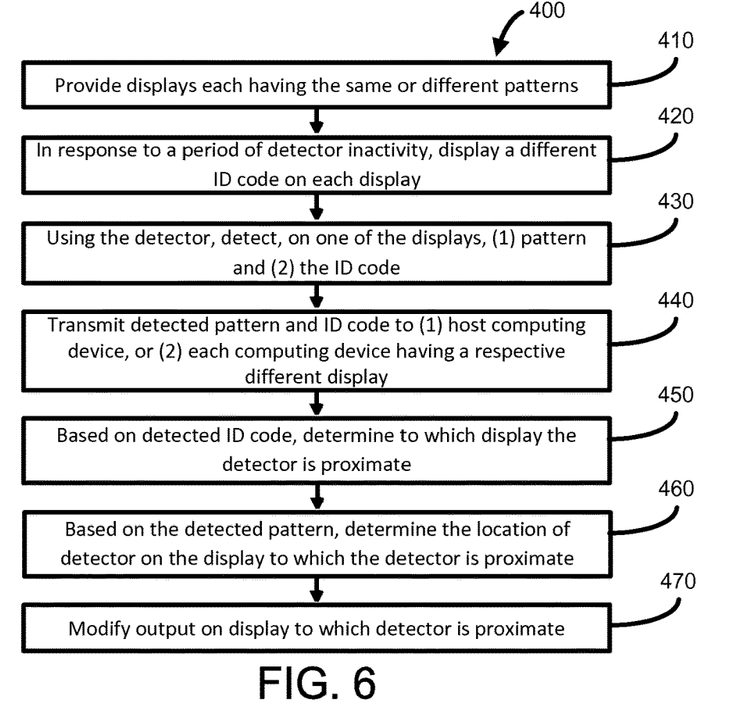

Turning to FIG. 6, at 410, multiple computing devices 150a-b may be provided, wherein the carriers 125 of the computing devices 150a-b may have the same or different patterns relative to one another.

At 420, if the detector 145 and handheld computing device 185a have not been proximate to one of the displays 115 for a predetermined period of time, and therefore none of the computing devices 150a-b have received from the handheld device 185a data representing the detected pattern, then each of the displays 115 may display a different identification (ID) code that is unique to each display 115. However, in other examples the same or different ID code may be displayed on different displays 115 sequentially, e.g. on only one display 115 at a time, such that the time of ID code measurement may indicate on which display 115 the ID code was detected.

The determination that no interaction has taken place for a predetermined period of time may be performed by the host device, such as by the handheld device 185a or by the host computing device 150b. The ID code may be represented in any suitable image form, such as a barcode, color pattern, alphanumeric text, a symbol, or a change in brightness or other image characteristic, for example. The ID code may be displayed throughout the area of the display in a repeating pattern, for example. The ID code may be a watermark generated by a modulation of pixels in the image. The pixels may be modulated such that the watermark is not visible to a human user. The predetermined period of time may be any suitable time period, such as a fraction of a second, or several seconds, for example.

At 430, the detection of part of a pattern on one of the displays 115 may be done as described earlier relative to 320 of FIG. 5. Additionally, the detector 145 of the handheld device 185a may detect the ID code that is displayed on the display 115, using a suitable optical sensor of the handheld device 185a, such as a camera.

At 440, data representing the detected pattern and detected ID code may be transmitted to one or more computing devices 150a-b, in similar ways as described earlier relative to 330 of FIG. 5.

At 450, based on the detected ID code, it may be determined to which display 115 the detector 145 is proximate. In some examples, such as if the handheld device 185a is a host device, each computing device 150a-b may have ID code data stored in its computer-readable medium 160 representing which ID code is to be displayed on its display 115. Each respective computing device 150a-b may compare the ID code in its stored ID code data with the detected ID code. If the detected ID code matches the stored ID code, this indicates to which computing device 150a-b the detector 145 and handheld device 185a are proximate.

In other examples, such as if the computing device 150b is a host device, the computing device 150b may have ID code data stored in its computer-readable medium 160 representing ID codes displayed on each of the displays 115 of the computing devices 150a-b. Thus, the host computing device 150b may compare the ID codes in its ID code data with the detected ID code to determine which computing device's ID code matches the detected ID code.

In yet other examples in which the computing device 150b is a host device, the computing device 150b may communicate the detected ID code data to each of the other computing devices, such as computing device 150a. In these examples, each computing device 150a-b may have ID code data stored in its computer-readable medium 160. Each computing device 150a-b may compare the ID code in its stored ID code data with the detected ID code data representing the ID code detected by the handheld device 185a. Thus, the comparison and determination of to which computing device 150a-b the handheld device 185a is proximate may be made.

At 460, based on the detected pattern, a computing device may determine the physical location of the handheld device 185a and detector 145 on the display 115 to which the detector was determined to be proximate. This may be done in a similar way as described relative to 350 of FIG. 5.

At 470, the computing device 150a-b to which the detector 145 is proximate may communicate to its display 115 to modify its output. This may be done in a similar way as described relative to 360 of FIG. 5.

Figure 7:
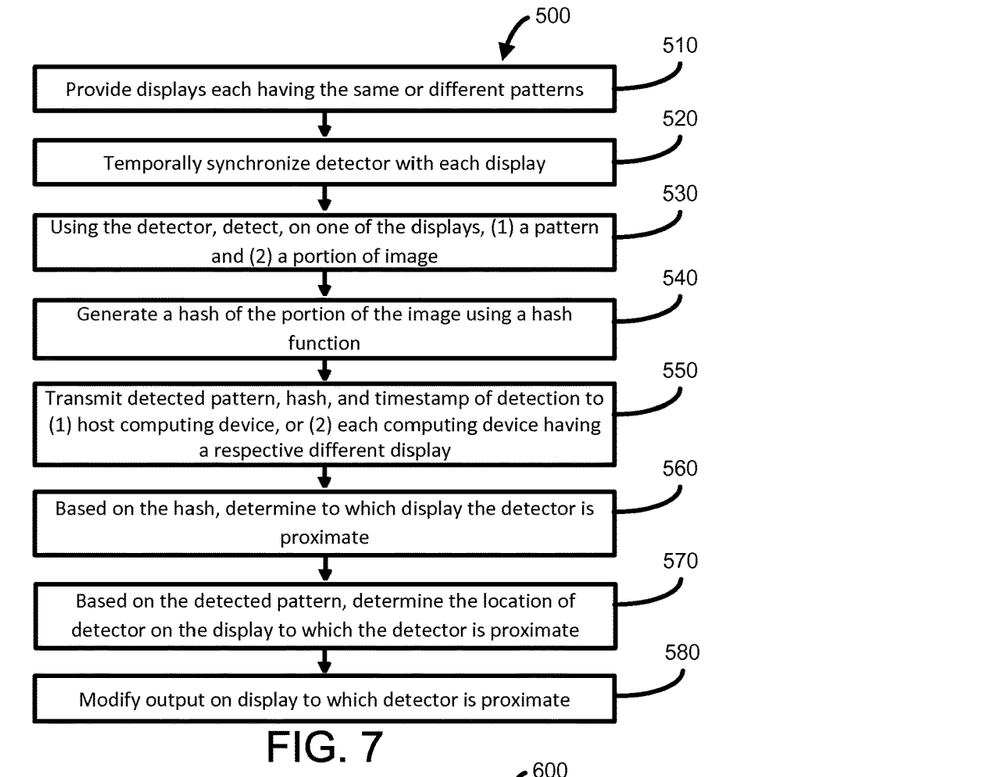

Turning to FIG. 7, at 510, multiple computing devices 150a-b may be provided, wherein the carriers 125 of the computing devices 150a-b may have the same or different patterns relative to one another.

At 520, once communication is established between the devices according to the connections in FIG. 4, each of the computing devices 150a-b and the handheld device 185a may synchronize their timers, e.g. clocks such that time stamps for actions by any of the devices can be compared to determine whether the actions occurred simultaneously or at different points in time.

At 530, the detection of part of a pattern on one of the displays 115 may be done as described earlier relative to 320 of FIG. 5. Additionally, the detector 145 of the handheld device 185a may detect a portion of the image displayed on the display 115, using a suitable optical sensor of the handheld device 185a, such as a camera. A timestamp representing the times of these detections may be stored by the controller 190.

At 540, a hash may be generated of the detected portion of the image, for example by using a predetermined hash function. Because the respective images being displayed on the different displays 115 may be different, the hash may uniquely identify one of the displays 115. The hash may be determined by the controller 190 of the handheld device 185a, or in other examples may be determined by one of the computing devices 150a-b.

At 550, data representing the detected pattern, hash, and timestamps of the detected patterns and detected image portion may be transmitted to one or more computing devices 150a-b, in similar ways as described earlier relative to 330 of FIG. 5.

At 560, based on the hash and timestamps, it may be determined to which display 115 the detector 145 is proximate. In some examples, each computing device 150a-b, or a host computing device, may compare a hash of the image it displayed to the hash of the detected image portion to determine to which computing device 150a-b the detector 145 and handheld device 185a are proximate.

At 570, based on the detected pattern, a computing device may determine the physical location of the handheld device 185a and detector 145 on the display 115 to which the detector was determined to be proximate. This may be done in a similar way as described relative to 350 of FIG. 5.

At 580, the computing device 150a-b to which the detector 145 is proximate may communicate to its display 115 to modify its output. This may be done in a similar way as described relative to 360 of FIG. 5.

Figure 8:
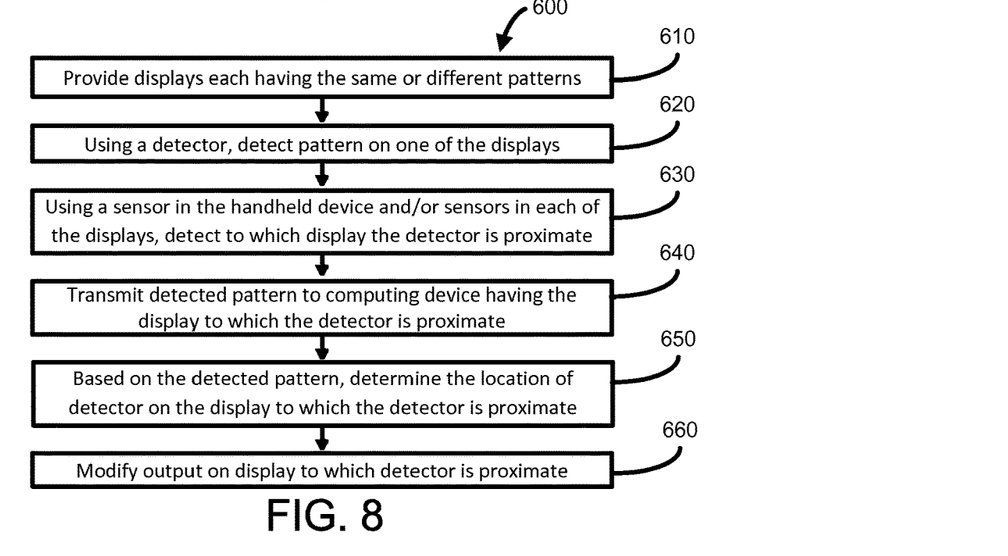

Turning to FIG. 8, at 610, multiple computing devices 150a-b may be provided, wherein the carriers 125 of the computing devices 150a-b may have the same or different patterns relative to one another.

At 620, the detection of part of a pattern on one of the displays 115 may be done as described earlier relative to 320 of FIG. 5.

At 630, one or more sensors in the handheld device 185a or in the displays 115 of the computing devices 150a-b may detect to which display 115 the detector 145 and handheld device 185a is proximate.

In some examples, one or more RF sensors, such as RF coils, in the displays 115 and/or in the computing devices 150a-b may detect the signal strength of communications from the handheld device 185a to determine if the handheld device 185a is proximate. In some examples, an RF sensor in the handheld device 185a may detect signal strengths from the displays 115 and/or computing devices 150a-b to determine if the handheld device 185a is proximate to one of the displays 115.

In some examples, acoustic sensors may be used to detect sounds generated by contact between the handheld device 185a and a display 115. In some examples, one of the devices, such as the handheld device 185a or display 115, may generate a sound, which may then be detected by the other of the handheld device 185a or display 115 using an acoustic sensor. The generated sound may be inaudible to humans due to volume and/or frequency.

In some examples, touch sensors, such as capacitive sensors or frustrated total internal reflection (FTIR) sensors in the displays 115 and/or computing devices 150a-b may be used to detect whether contact is made between the handheld device 185a and a display 115, or by a fingertip and the display 115. In some examples, each display 115 may display different touch pattern. The touch pattern may include a series of dots, numbers, or other image features that, if pressed in a non-ordered way or in a sequential order by the user holding the handheld device 185a or using a fingertip, then the computing device 150a-b housing the display 115 that was touched may determine that the handheld device 185a is proximate.

In some examples, the computing devices 150a-b, such as tablets, may include sensors such as magnetometers, which may used to detect magnetic fields when the handheld device 185a is proximate.

In some examples, photosensors in the displays 115 may detect a flash on the display resulting from a proximate handheld device 185a. In other examples, the photosensors may be in the handheld device 185a.

At 640, data representing the detected pattern may be transmitted to one or more computing devices 150a-b, in similar ways as described earlier relative to 330 of FIG. 5. In examples in which the handheld device 185a determined to which computing device 150a-b the handheld device 185a is proximate, the handheld device 185a may communicate the detected pattern only to that handheld device 185a. In examples in which a computing device 150a-b determined that the handheld device 185a is proximate to it, the handheld device 150a-b may communicate the detected pattern to each of the computing devices 150a-b.

At 650, based on the detected pattern, the computing device 150a-b may determine the physical location of the handheld device 185a and detector 145 on the display 115 to which the detector was determined to be proximate. This may be done in a similar way as described relative to 350 of FIG. 5. Additionally, the computing device 150a-b may make this determination if it is known to be the computing device to which the detector is proximate based either on (1) if only the proximate computing device receives the detected pattern as described at step 640, or (2) the computing device had determined at 630 that it is the proximate computing device.

At 660, the computing device 150a-b to which the detector 145 is proximate may communicate to its display 115 to modify its output. This may be done in a similar way as described relative to 360 of FIG. 5.

Figure 9:
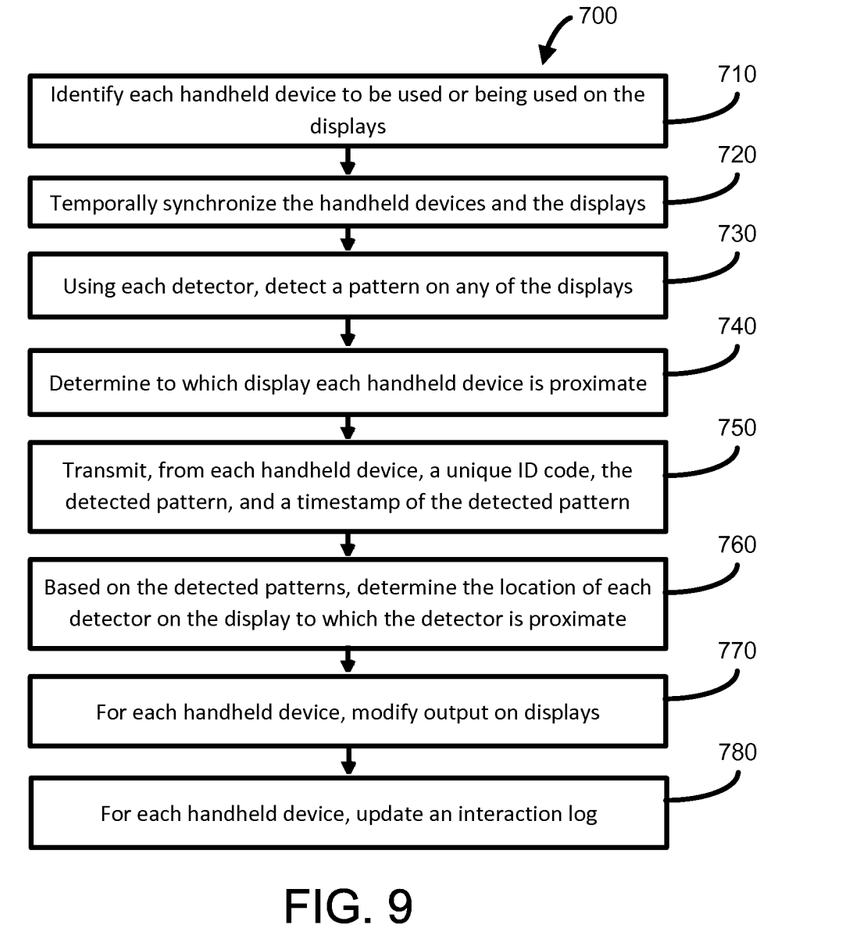

FIG. 9 is a flow diagram illustrating a positional input method 700 according to some examples. In some examples, the methods may be varied, such that some steps may be added, and some steps may be omitted. In describing FIG. 9, reference will be made to FIGS. 4-8. FIG. 9 may allow simultaneous use of multiple handheld devices 185a-b.

At 710, each handheld device 185a-b and thus its respective detector 115 may be identified. Each handheld device 185a-b may be assigned ID codes that are unique relative to each other.

At 720, once communication is established between the devices according to the connections in FIG. 4, each of the computing devices 150a-b and the handheld devices 185a and 185b may synchronize their timers, e.g. clocks such that time stamps for actions by any of the devices can be compared to determine whether the actions occurred simultaneously or at different points in time.

At 730, each detector 145 of the handheld devices 185a-b may respectively detect a part of a pattern on one of the displays 115. Each detection may be done as described earlier relative to 320 of FIG. 5.

At 740, in some examples, it may be determined to which computing device 150*a-b* and display 115 each handheld device 185*a-b* is associated. This may be done, for example, by determining to which computing device's display 115 each handheld device 185*a-b* is proximate, according to any of the methods 300, 400, 500, or 600 described earlier. In some examples, multiple handheld devices 185*a-b* may be proximate to the same computing device's display 115. In other examples, each handheld device 185*a-b* may be proximate to different displays.

At 750, each handheld device 185*a-b* may transmit, to one or more computing devices 150*a-b*, data representing the pattern it detected, the handheld device's ID code, and the timestamp of the detection of the pattern. This may, for example, be done in similar ways as described earlier relative to 330 of FIG. 5. In examples in which each handheld devices 185*a-b* itself determined to which computing devices 150*a-b* it is proximate, the respective handheld devices 185*a-b* may communicate the detected pattern only to the computing device 150*a-b* to which it is proximate. In examples in which one of the computing devices 150*a-b* determined that a given handheld device 185*a* is proximate to it, the handheld device 185*a* may communicate the detected pattern to each of the computing devices 150*a-b*.

At 760, based on the detected pattern, each computing device 150*a-b* may determine the physical location of the handheld device 185*a* and detector 145 on the display 115 to which the detector was determined to be proximate. This may be done in a similar way as described relative to 350 of FIG. 5. Additionally, each computing device 150*a-b* may make this determination if it is known to be the computing device to which a detector 145 is proximate based either on (1) if only the proximate computing device receives the detected pattern as described at step 640, or (2) the computing device had determined at 630 that it is the proximate computing device.

At 770, the computing device 150*a-b* to which a handheld device 185*a-b* is proximate may communicate to its display 115 to modify its output, e.g. to modify the color of pixels being displayed at the physical location. For example, if a user is using a handheld device 185*a-b* to draw on the display 115, the determined physical location of the display 115 may display colored lines to represent the drawing in response to the handheld device 185*a* being proximate to that physical location. The output may be modified in accordance with the ID code of the handheld device 185*a-b*, such that the modified output is different depending on which handheld device 185*a-b* is being used on the respective computing device 150*a-b*. For example, one handheld device 185*a* may draw in a first color, and another handheld device 185*b* may draw in a second, different color. In other examples, other visual cues other than colors may be used to visually identify which handheld device 185*b* interacted with a display 115.

In some examples, the same software, such as graphics software, may be open on multiple computing devices 150*a-b*. Thus, multiple users may simultaneously work on the same drawing or project. In some examples, one user may draw on one display 115, and another user may draw on a different display 115, however the input from all users may appear on all of the displays 115 simultaneously to allow collaborative drawing. In other examples, multiple users may work on the same display 115. In yet other examples, each user may only have permission to draw on one of the displays 115, however the output from all users using separate displays 115 may appear on each of the displays 115.

Because each handheld device 185*a-b* is separately identified with an ID code, certain permissions may be available to some users but not to other users. For example, each user may have sole permission to erase their own drawing marks.

In some examples, multiple handheld devices 185*a-b* may be associated together in a group, such that one group of handheld devices 185*a-b* may be collectively given permission to perform a task, or may all cause the same output modification on the displays 115.

At 780, for each handheld device 185*a-b*, an interaction log may be stored in any of the devices in the system 100. For each handheld device 185*a-b*, the interaction log may comprise data regarding any interaction events. The data for each interaction event may include, for example, the identity of the display 115, the timestamp of the interaction, the detected pattern, and/or the location on the display 115 of the interaction.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A positional input method comprising:
  determining, using a handheld device comprising a detector, to which display of a plurality of displays the detector is proximate, wherein each display of the plurality of displays includes a predetermined optical pattern;
  determining the detector to be inactive based on a display of the plurality of displays not receiving the predetermined optical pattern for a predetermined period of time;
  displaying an identification code on the display in response to determining the detector to be inactive, wherein the identification code displayed on each display of the plurality of displays is unique to the display;
  detecting, using the detector, at least a part of the predetermined optical pattern disposed on the display to which the detector is proximate, the part of the predetermined optical pattern corresponding to a location on the display; and
  reading, using the detector, a change in a polarization state of the predetermined optical pattern of a polarized light in response to the polarized light passing through the display, wherein the change in the polarization state of the predetermined optical pattern determines characteristics of the polarized light passing through the display.

2. The positional input method of claim 1 wherein the predetermined optical pattern is detected by:
  passing the polarized light generated by a source through the predetermined optical pattern, the predetermined optical pattern being a predetermined pattern of visibly transparent polarizing elements disposed on the display; and detecting a change in the polarization state of the polarized light corresponding to the location on the display.

3. The positional input method of claim 1 wherein:
each of the displays has a respective different optical pattern proximate to or disposed on the display,
wherein the display to which the detector is proximate is determined based on detection of one of the different optical patterns.

4. The positional input method of claim 1, wherein a sensor in the handheld device determines the display to which the detector is proximate based on the identification code displayed by the display.

5. The positional input method of claim 4 wherein the identification code comprises a change in brightness.

6. The positional input method of claim 1 wherein the identification code is sequentially displayed by each of the displays, the detected ID code being one of the respective different identification codes.

7. The positional input method of claim 1 wherein the display to which the detector is proximate is determined by:
detecting, using the detector or a sensor in the handheld device, a portion of an image displayed by the display;
generating a hash based on the detected portion of the image; and
comparing the generated hash to a hash that is based on data used to display the portion of the image.

8. The positional input method of claim 1 wherein the display to which the detector is proximate is determined using a sensor coupled to the display or in the handheld device that comprises the detector.

9. The positional input method of claim 8 wherein the sensor is a radiofrequency (RF) sensor, an acoustic sensor, a touch sensor, a magnetometer, or a photosensor.

10. The positional input method of claim 1 further comprising:
determining to which display of a plurality of displays a second detector is proximate;
detecting, using the second detector, at least a part of an optical pattern disposed on the second display to which the second detector is proximate, the part of the optical pattern corresponding to a location on the second display.

11. A positional input system, comprising:
a plurality of displays, each of the displays having disposed thereon a respective predetermined optical pattern, the predetermined optical pattern being a predetermined pattern of visibly transparent polarizing elements disposed on the each of the plurality of displays;
a processor to:
determine to which display of the plurality of displays a detector is proximate;
determine the detector to be inactive based on a display of the plurality of displays not receiving the predetermined optical pattern for a predetermined period of time; and
display an identification code on the display in response to determining the detector to be inactive, wherein the identification code displayed on the each display of the plurality of displays is unique to the display; and
a handheld device comprising the detector to:
detect a part of the predetermined optical pattern disposed on the display to which the detector is proximate, the part of the predetermined optical pattern corresponding to a location on a surface of the display; and
read a change in a polarization state of the predetermined optical pattern of a polarized light in response to the polarized light passing through the display, wherein the change in the polarization state of the predetermined optical pattern determines characteristics of the polarized light passing through the display; and
a transmitter to transmit data representing the location of the handheld device to a computing device communicatively coupled to the handheld device.

12. A positional input method comprising:
in a system comprising a plurality of displays each having disposed thereon a respective optical pattern, the predetermined optical pattern being a predetermined pattern of visibly transparent polarizing elements disposed on the plurality of displays:
for each of a plurality of detectors, detecting, using the detector, at least a part of an optical pattern disposed on a display of the plurality of displays to which the detector is proximate, the part of the optical pattern corresponding to a location on a surface of the display;
reading, using the detector, change in a polarization state of the predetermined optical pattern of a polarized light in response to the polarized light passing through the plurality of displays, wherein the change in the polarization state of the predetermined optical pattern determines characteristics of the polarized light passing through the display;
determining the detector to be inactive based on the display of the plurality of displays not receiving the predetermined optical pattern for a predetermined period of time; and
displaying an identification code on the display in response to determining the detector to be inactive, wherein the identification code displayed on the each display of the plurality of displays is unique to the display.

13. The positional input method of claim 12 further comprising generating a respective interaction log for each of the detectors, each interaction log comprising data representing interaction events between the detector and a display of the plurality of displays.

14. The positional input method of claim 12 further comprising modifying output on one or more of the displays in response to one of the detectors detecting one of the optical patterns, the output modification being different depending on which of the detectors detects the optical pattern.

* * * * *

UNITED STATES PATENT AND TRADEMARK OFFICE
CERTIFICATE OF CORRECTION

PATENT NO.         : 10,353,488 B2
APPLICATION NO.    : 15/314863
DATED              : July 16, 2019
INVENTOR(S)        : Fred Charles Thomas et al.

Page 1 of 1

It is certified that error appears in the above-identified patent and that said Letters Patent is hereby corrected as shown below:

In the Claims

In Column 17, Line 15, Claim 6, after "claim 1" insert -- , --.

Signed and Sealed this
First Day of October, 2019

Andrei Iancu
*Director of the United States Patent and Trademark Office*